United States Patent Office 2,913,314
Patented Nov. 17, 1959

2,913,314

PURIFICATION OF TUNGSTEN CARBIDE

Robert C. Osthoff, Schenectady, N.Y., assignor to General Electric Company, a corporation of New York No Drawing. Application February 26, 1957
Serial No. 642,376

17 Claims. (Cl. 23—208)

This invention relates to reducing the trace metal content of tungsten carbide. More particularly, this invention relates to a refining process for reducing the trace metal content, such as iron and manganese, of tungsten carbide which comprises halogenating tungsten carbide in the presence of a Lewis base.

Tungsten carbide is an extremely important article of commerce, useful in applications requiring high temperatures, hardness and/or high wear resistance. It is the most important constituent of modern cemented carbides. Sintered or fused tungsten carbides are employed in applications requiring high wear resistance.

Tungsten carbide is well known and can be prepared, for example, by those methods described in "Refractory Hard Metals" by Schwarzkoff et al., pp. 138–161 (MacMillan Co., 1953). However, tungsten carbide produced by these methods does not always meet specifications as to trace metals, for example, iron and manganese, present in the final product. Thus, where tungsten carbide is prepared by the method of Li and Dice, described in U.S. Patent 2,535,217, wherein the carbide is produced directly from ore containing tungsten oxide by reduction with carbon, such as bituminous coal, in the presence of iron-tin alloys at temperatures as low as 1420° C., there is obtained a product containing iron and manganese in the order of about 1 or more percent. These trace metals, which tend to soften the carbide, cannot be removed even when tungsten carbide is treated with strong acids under conditions at which chemical attack of the tungsten carbide itself is observed. Thus, it appears that these trace metals are trapped in the carbide in such a manner which is resistant to chemical attack.

Unexpectedly, I have now discovered that trace metals present in tungsten carbide can be reduced, for example, to 50% to 90% of their original content by a process which comprises halogenating tungsten carbide in the presence of a Lewis base. The unexpectedness of this process is even more enhanced by the fact that removal is effected at 0° C. whereas strong acid extractions, for example, with nitric, hydrochloric, hydrofluoric and various combinations thereof fail even under extreme reaction conditions.

The mechanism of the reaction is not understood since if the trace metals were on the surface of the crystals of carbide, one would expect them to be removed by strong acids. Since this is not the case, the trace metals are probably trapped in the interior of the crystals. On the other hand, if this were true, it is difficult to conceive of a mechanism whereby halogenation in the presence of a Lewis base should succeed where acid extraction fails.

In general, the reaction is carried out by suspending tungsten carbide particles in a Lewis base and thereupon adding a halogen or a hydrohalogen to the suspension at about 0° C. to room temperature. The halogen or hydrohalogen is added slowly so as to prevent a violent reaction with certain Lewis bases which might occur if the halogen is added too rapidly. At the end of time, the suspension is filtered, washed, and dried to recover tungsten carbide in substantially quantitative amounts. The resulting product not only has a reduced trace metal content, but has a brighter and cleaner appearance than the original material.

The term "Lewis base" as employed herein refers to a base understood in terms of G. N. Lewis' concept of acids and bases. Lewis has defined an acid as an electron acceptor and a base as an electron donor. Thus, in the formation of an oxonium salt from an ether, the proton of the mineral acid accepts an electron pair from oxygen and thus functions as a Lewis acid while the electron donating ether functions as a Lewis base.

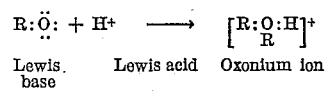

Lewis base    Lewis acid    Oxonium ion

Thus, a wide variety of compounds which are Lewis bases can be employed, for example, ethers (e.g., methyl, ethyl, propyl, butyl ethers and isomers and homologues thereof); mixed ethers (e.g., ethyl methyl ether, methyl isopropyl ethers); aromatic and aromatic alkyl ethers (e.g., anisole, etc.); alcohols (e.g., methanol, ethanol, propanol, butanol, isomers and homologues thereof); amines (e.g., diethyl amine, dipropyl amine, dibutyl amine, isomers and homologues thereof). Although liquid Lewis bases are preferred for obvious reasons, solid or gaseous Lewis bases can be employed in conjunction with inert non-Lewis solvents. Thus, although no reaction is observed when tungsten carbide is halogenated in benzene, benzene may be used in conjunction with a solid ether or alcohol. The more volatile Lewis bases are preferred since traces of these compounds can be more easily removed from the carbide. Diethylether and ethanol are the preferred Lewis bases.

Any source of halogen can be employed provided it will preferentially react with the trace metals rather than with tungsten carbide or the Lewis base under reaction conditions. In practice, I have found that halogens, preferably chlorine or bromine, are capable of most effectively removing these trace metals. However, the hydrohalogens, for example, HCl and HBr, can also be employed although they are generally less effective than the halogens. Chlorine is the preferred halogenating agent.

A remarkable feature of this invention is the low temperature and facility by which the trace elements are removed. In general, the only factor which controls the upper temperature limits is the temperature at which the Lewis base is appreciably halogenated. With alcohol and ethers, optimum results are generally achieved by carrying out the reaction at about 0° C. to room temperature, for at these low temperatures it is possible to minimize halogenation of the Lewis base. When halogenation is carried out substantially above room temperature, the Lewis base is exothermically halogenated. Thus, depending on the particular Lewis base employed, the reaction can be carried out from below room temperature to a temperature at which the Lewis base reacts appreciably with the halogenation agent.

The temperature of the reaction mixture can also be controlled by the rate of halogen or hydrohalogen addition which preferably is at a slow rate, for example, from 1 to 100 parts by volume of halogenation agent per minute per 10 parts of carbide, but preferably from 30 to 40 parts by volume. Slow addition minimizes the reaction of the halogen or hydrohalogen with the solvent. The time of these additions can vary from 5 to 300 minutes or longer, but preferably 30 to 50 minutes.

The ratio of ingredients can be varied over wide limits provided there is at least one equivalent of Lewis base and one equivalent of halogen or hydrohalogen for each mole of trace element which one desires to remove. The upper limits of the ingredients are not critical and will depend on practical considerations. However, I prefer to employ 50 to 150 parts by volume of Lewis base for each part by weight of tungsten carbide. Although the process is usually carried out at atmospheric pressure, the use of super- or subatmospheric pressures are not precluded.

The following examples are illustrative of the practice of my invention and are not intended for purposes of limitation. In the examples all parts are by weight unless otherwise stated.

The following examples illustrate the reduction of the iron content in tungsten carbide.

Chlorine at the rate of about 35 parts by volume per minute was passed into a suspension of 10 parts of tungsten carbide in 250 parts by volume of diethyl ether maintained at about 25° C. for 4.5 hours. Upon completion of the reaction the carbide was filtered and washed with the Lewis base. X-ray emission spectrograph of the concentrated Lewis base filtrate revealed that only traces of tungsten were present in contrast to the larger amounts of iron, indicating that only very slight attack of the tungsten carbide had occurred while the iron was preferentially removed. The results are presented in Table I.

TABLE I

*Chlorination of tungsten carbide samples at 25° C.*

| Example | Percent Iron Content | |
|---|---|---|
| | Orig. | Final |
| 1 | 1.09 | 0.11±0.01 |
| 2 | 1.09 | 0.37±0.04 |

The following examples illustrate the reduction of both the iron and manganese content of tungsten carbide. These examples were chlorinated by adding chlorine at the rate of about 35 parts by volume per minute for 4.5 hours at room temperature to a slurry of 10 parts of tungsten carbide in 250 parts by volume of ethanol. The results are presented in Table II.

TABLE II

*Iron and manganese content of tungsten carbide after chlorination in the presence of ethanol*

| Ex. | Original Iron and Manganese, Percent Content | Final Iron, Percent Content | Percent of Original Manganese Remaining |
|---|---|---|---|
| 3 | 1.09 | 0.37 | 22 |
| 4 | 1.02 | 0.40 | 47 |
| 5 | 0.48 | 0.21 | 52 |

The following examples illustrate the use of HCl as a chlorination agent. In these examples, 10 parts of tungsten carbide was dispersed in 250 parts by volume of ethanol and gaseous HCl added at the rate of 35 parts by volume per minute at room temperature. The results are presented in Table III.

TABLE III

*Hydrochlorination of tungsten carbide*

| Example | Reaction Time, hours | Percent of Original Iron Remaining in Tungsten Carbide |
|---|---|---|
| 6 | 4 | 74 |
| 7 | 2 | 80 |

Although the foregoing examples have described some variations and modification of ingredients and reaction conditions which may be employed in the practice of the present invention, it should be understood that my process is applicable to other reaction conditions, other Lewis bases, and proportions of ingredients which are not specifically illustrated by the examples.

The products of this invention are useful in those applications where tungsten carbide is now presently used, taking in consideration the fact that a reduction in iron and manganese results in a harder material. Thus, the product of my invention can be used in tools, crucibles, machinery, drilling apparatus and other applications which demand refractory properties, hardness and/or high wear resistance.

What I claim as new and desire to secure by Letters Patent of the United States is:

1. A process of removing from impure tungsten carbide, the trace metals which react with a halogenating agent selected from the group consisting of halogens and hydrohalogens which comprises contacting the impure tungsten carbide with a mixture of said halogenating agent and an electron donor selected from the group consisting of alkyl ethers, aryl ethers, alkylaryl ethers, alkyl amines, and alkyl alcohols, thereby reacting the trace metals with said halogenating agent and thereafter separating the purified tungsten carbide from the balance of the reaction mixture.

2. The process of claim 1 wherein the halogenating agent is a hydrohalogen.

3. The process of claim 1 carried out at from 0° C. to about room temperature.

4. The process of claim 1 wherein the halogenating agent is a halogen.

5. The process of claim 4 carried out at from about 0° C. to about room temperature.

6. The process of claim 1 wherein the electron donor is an alkyl ether.

7. The process of claim 1 wherein the electron donor is an alkyl alcohol.

8. The process as in claim 1 wherein the halogenating agent is hydrogen chloride.

9. The process as in claim 1 wherein the halogenating agent is chlorine.

10. A process of removing from impure tungsten carbide, the trace metals which react with chlorine which comprises contacting the impure tungsten carbide with a mixture of chlorine and diethyl ether, thereby reacting the trace metals with chlorine and thereafter separating the purified tungsten carbide from the balance of the reaction mixture.

11. The process as in claim 10 wherein the reaction is carried out at a temperature within the range from about 0° C. to about room temperature.

12. A process of removing from impure tungsten carbide, the trace metals which react with chlorine which comprises contacting the impure tungsten carbide with a mixture of chlorine and ethanol thereby reacting the trace metals with chlorine and thereafter separating the purified tungsten carbide from the balance of the reaction mixture.

13. The process as in claim 12 wherein the reaction is carried out in the temperature range from about 0° C. to about room temperature.

14. A process of removing from impure tungsten carbide, the trace metals which react with hydrogen chloride which comprises contacting the impure tungsten carbide with a mixture of hydrogen chloride and diethyl ether, thereby reacting the trace metals with hydrogen chloride and thereafter separating the purified tungsten carbide from the balance of the reaction mixture.

15. The process as in claim 14 wherein the reaction is carried out in the temperature range from about 0° C. to about room temperature.

16. A process of removing from impure tungsten carbide, the trace metals which react with hydrogen chloride which comprises contacting the impure tungsten carbide with a mixture of hydrogen chloride and ethanol, thereby reacting the trace metals with hydrogen chloride and thereafter separating the purified tungsten carbide from the balance of the reaction mixture.

17. The process as is claim 16 wherein the reaction is carried out in the temperature range from about 0° C. to about room temperature.

References Cited in the file of this patent

UNITED STATES PATENTS 2,253,471  Muskat et al. _____ Aug. 19, 1941